United States Patent
Rhead

(10) Patent No.: US 7,185,445 B2
(45) Date of Patent: Mar. 6, 2007

(54) TAPE MEASURE

(76) Inventor: Marten C. Rhead, 3312 Morley Cres. N.W., Calgary, AB (CA) T2M 4K9

( * ) Notice: Subject to any disclaimer, the term of this patent is extended or adjusted under 35 U.S.C. 154(b) by 0 days.

(21) Appl. No.: 11/225,546

(22) Filed: Sep. 14, 2005

(65) Prior Publication Data

US 2006/0005417 A1    Jan. 12, 2006

Related U.S. Application Data

(62) Division of application No. 10/798,858, filed on Mar. 12, 2004.

(51) Int. Cl.
*G01D 3/10* (2006.01)
(52) U.S. Cl. .............. 33/755; 33/761; 33/769
(58) Field of Classification Search .......... 33/755, 33/758, 759, 760, 761, 766, 768, 769, 770
See application file for complete search history.

(56) References Cited

U.S. PATENT DOCUMENTS

| | | | | |
|---|---|---|---|---|
| 1,303,756 A * | 5/1919 | Ballou | ............ | 33/758 |
| 2,893,656 A * | 7/1959 | Carlson | ............ | 33/761 |
| 2,992,487 A * | 7/1961 | Miller | ............ | 33/760 |
| 4,462,160 A * | 7/1984 | Cohen et al. | ............ | 33/760 |
| 4,574,486 A * | 3/1986 | Drechsler | ............ | 33/765 |
| 4,580,347 A * | 4/1986 | McKnight | ............ | 33/760 |
| 5,012,590 A * | 5/1991 | Wagner et al. | ............ | 33/759 |
| 5,077,911 A * | 1/1992 | von Wedemeyer | ............ | 33/770 |
| 5,435,074 A * | 7/1995 | Holevas et al. | ............ | 33/668 |
| 6,108,926 A * | 8/2000 | Fraser et al. | ............ | 33/768 |
| 6,226,886 B1 * | 5/2001 | Lamond et al. | ............ | 33/769 |
| 6,256,901 B1 * | 7/2001 | Lin | ............ | 33/767 |
| 6,874,245 B2 * | 4/2005 | Liu | ............ | 33/758 |

* cited by examiner

*Primary Examiner*—Christopher W. Fulton
(74) *Attorney, Agent, or Firm*—G F Gallagher

(57) ABSTRACT

An improved tape measure for making an internal measurement from a member between generally parallel members of the type having a tape coiled in a housing having a tape hook external to the housing on an unattached end portion of the tape, and measurement lines and numerals on a concave side portion of the tape which increment from the hook and which can be read when the hook is pulled from the housing, wherein the improvement comprises: a non slip device positioned along an outside face portion of the hook so that when the outside of the hook is pressed against one member the hook will be less inclined to slip therealong. In a preferred aspect the above tape measure further comprises a belt clip having a downwardly extending arm attached to a broad side of the housing and a soft plastic gripping pad positioned on one of the belt clip arm and the broad side of the housing adjacent to the arm to provide better adhesion when the belt clip is engaged on a worn belt.

5 Claims, 1 Drawing Sheet

TAPE MEASURE

PRIOR APPLICATION

This application is filed as a divisional application of application Ser. No. 10/798,858 filed Mar. 12, 2004.

FIELD OF THE INVENTION

This invention relates to coiled steel tape measures. More particularly this invention relates to an improved tape measure for making internal measurements between generally parallel members. This invention also discloses a design for improved gripping while clipped on a belt.

BACKGROUND OF THE INVENTION

Taking an internal measurement, say for example, measuring the exact width of a room between two walls is problematic. First it is necessary to maintain the outside portion of the hook on the tape against one of the two walls while the tape is extended. To prevent the tape from bending under the force of gravity it is necessary that the tape and the tape measure be maintained in an upright position. Then it is necessary, while holding the back of the housing of the tape measure against the other of the walls to read the tape measure. Typically a tape measure has a lateral slot which is about ¼ inch high through which the tape is pulled from the housing. One must read the measurement lines and numerals on the tape where it begins to project from the housing. Because the housing is about ¼ inch above the tape one should align their eye on a line projected along a front side wall of the housing which is perpendicular to the tape to avoid parallax and thereby obtain an accurate reading. The problem with doing this is that it is impossible to position one's eye perpendicular to the tape above where the tape projects from the housing when the tape measure is adjacent to the wall. One solution is to extend the tape around a corner on the adjacent wall, and then read the tape at a midpoint in the arc where the tape bends around the corner. But to do this with a reasonable degree of accurately one must ensure that they read the tape when there eye is on a line which projects perpendicularly from a midpoint of the tape bending around the corner. This is time consuming and problematic.

Some tape measures are numerated to allow one to read both outside and inside measurements. The set of numerals for inside measures includes the extended length of the tape plus and additional few inches for the length of the housing on the tape measure when the back thereof is held against the other wall. This simplifies having to add this additional length onto the measured projection of the tape from the housing. But the problem with this is that when measuring a longer length, one may inadvertently read from the wrong set of numerals. One solution to this is to place one set of numerals on the convex side of the tape. But these are subject to excessive wear when the tape moves in and out of the housing. Another problem is that it is just as difficult to read the underside of the tape accurately, especially when the tape measure is positioned adjacent to the other wall. What is needed is a way to so clearly distinguish between the sets of numerals so that they could not inadvertently be mistake even at the end of a long day when a user is not alert.

Yet another problem is that tape measures are too easily brushed off a user when clipped on a belt. If a tape measure is brushed off and falls on a hard surface, or from a ladder, it is likely to be damaged.

OBJECTS OF THE INVENTION

It is an object of this invention to disclose improvements in a tape measure which allow a user to more readily and accurately use and read the tape. It is an object of this invention to disclose a tape measure which facilitates taking inside measurements. One improvement disclosed utilises a has high friction outer hook end portion. It is yet a further object of this invention to disclose a tape measure which has a second scale positioned on its concave side which and which utilises a colored light emitting diode and a scale having a contrasting color to the light to differentiate that scale when making inside measurements. It is yet another object of this invention to disclose a tape measure which uses a focused light to overcome reading error arising from parallax. It is a final object of this invention to disclose improvements to a tape measure which will prevent unintended disengagement when the tape measure is clipped on a belt.

One aspect of this invention provides for an improved tape measure for making an internal measurement from a member of the type having a tape coiled in a housing having a tape hook external to the housing on an unattached end portion of the tape, and measurement lines and numerals on a concave side portion of the tape which increment from the hook and which can be read when the hook is pulled from the housing, wherein the improvement comprises: a non slip means positioned along an outside face portion of the hook so that when the outside of the hook is pressed against one member the hook will be less inclined to slip therealong.

In a preferred aspect the above tape measure further comprises a belt clip having a downwardly extending arm attached to a broad side of the housing and a soft plastic gripping pad positioned on one of the belt clip arm and the broad side of the housing adjacent to the arm to provide better adhesion when the belt clip is engaged on a worn belt.

Various other objects, advantages and features of this invention will become apparent to those skilled in the art from the following description in conjunction with the accompanying drawings.

FIGURES OF THE INVENTION

Figure 1:
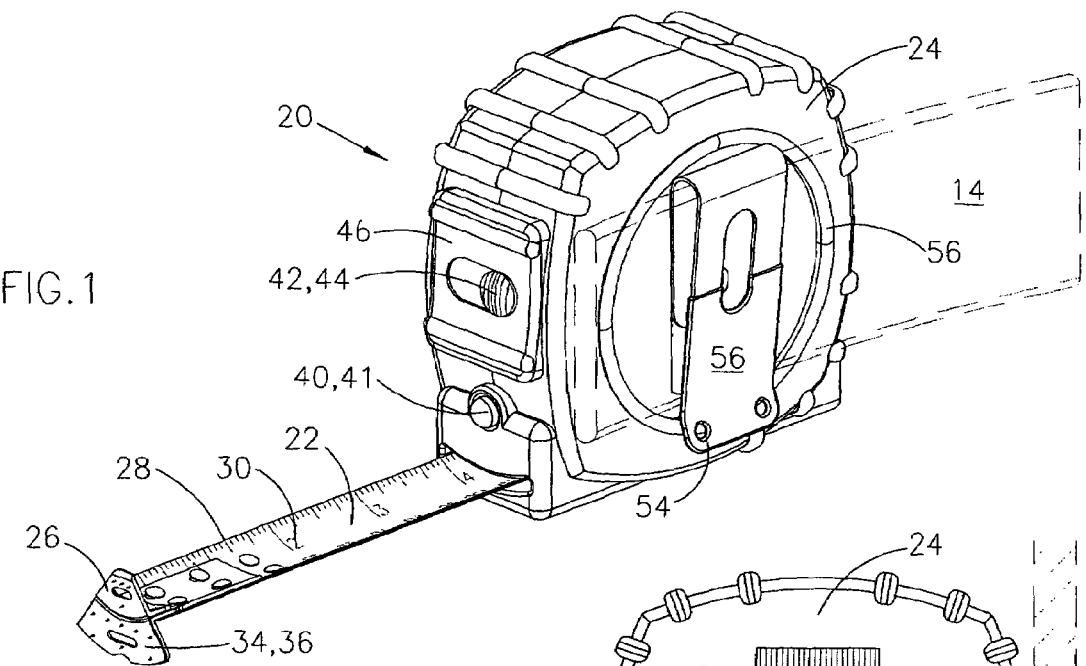
FIG. 1 is a perspective view of a tape measure having the following improvements thereon comprising the invention herein. Generally these improvements are a roughened surface on an outside end portion of the hook on an end portion of the tape, a light to illuminate the tape, and soft plastic gripping pads positioned to better retain a belt clip.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
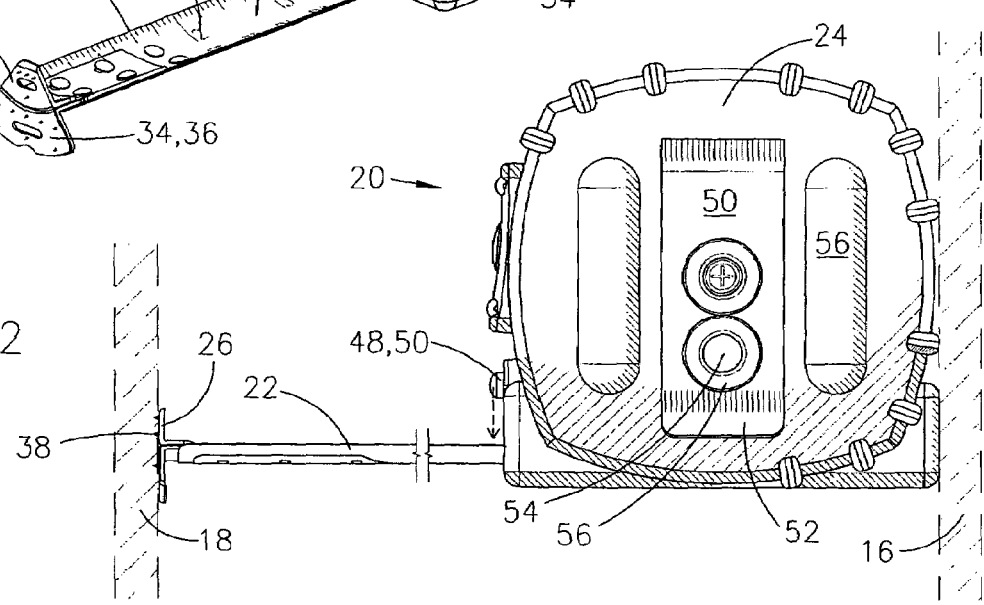
FIG. 2 is a cross sectional view of a tape measure similar to that shown in FIG. 1 showing alternative embodiments of the improvements shown in FIG. 1.

Turning now to the drawings and more particularly to FIG. 1 we have a perspective view of a tape measure having improvements thereon comprising the invention herein. FIG. 2 is a cross sectional view of a tape measure similar to that shown in FIG. 1 showing alternative embodiments of the improvements shown in FIG. 1. Most generally an improved tape measure for making an internal measurement from a member 18 (or alternatively for making an internal measurement between two generally parallel members 18, 16) has a tape 22 coiled in a housing 24 having a tape hook 26 external to the housing 24 on an unattached end portion of the tape 22, and measurement lines 28 and numerals 30 on a concave side portion of the tape 22 which increment from the hook 26 and which can be read when the hook 26 is pulled from the housing 24, wherein the improvement comprises: a non slip means 34 positioned along an outside face portion of the hook 26 so that when the outside of the hook 26 is pressed against one member 18 it will be less inclined to slip therealong.

The non slip means 34 might comprise horizontal ridges, burred edges, matrix of rough points or a small sticky plastic pad (none shown). Within this application plastic is defined to include a synthetic or natural rubber. FIG. 1 shows a non slip means 34 which is a rough surface having a multiplicity of rough points 36. FIG. 2 shows a nonslip means 34 which comprises barbed points 38.

A light 40 is positioned to illuminate a measured length on the tape 22. In one embodiment of the invention the light 40 most preferably is a light intermitting diode LED 41. A light switch 42 to is positioned to be operated in conjunction with the tape brake 46. Most preferably the light switch 42 comprises a slide button 44 centrally positioned on the tape brake 46. If the light 40 comprises a focused light 48, or laser 50, and is positioned to illuminate the measured length on the tape 22 then the problem of parallax is largely avoided. If the tape 22 comprises numerals 30 for outside measurement of one color and numerals 31 for inside measurement of a different color and if the numerals 31 for inside measurement significantly contrast with a color of the light emitting diode 41 then the numerals 31 for inside measurement will significantly stand out from the outside measurement numerals 30 when the light emitting diode 41 is switched on.

Figure 3:
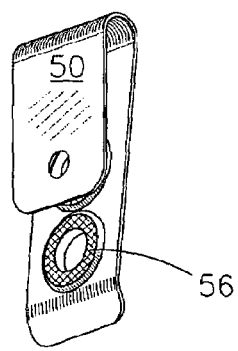
FIG. 3 is a perspective view of a perspective view showing the rear side portion of the belt clip shown in FIG. 2.
Figure 4:
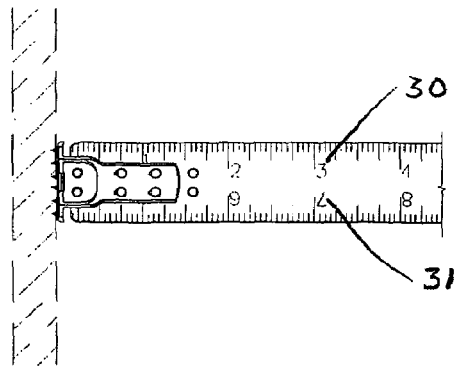

When the tape measure 20 comprises a belt clip 50 having a downwardly extending arm 52 which is attached to a broad side of the housing 24, if a soft plastic gripping pad 56 is positioned on either the belt clip arm 52 or the broad side of the housing 24 adjacent to the arm 52, then better adhesion is provided when the belt clip 50 is engaged on a worn belt 10. In a preferred embodiment of the invention the belt clip arm 52 has an opening 54 therethrough and the gripping pad extends through the opening 54 as well as over and around the opening 54 on both a belt side and an opposite side of the belt clip arm 52. FIG. 3 is a perspective view showing the rear side portion of the belt clip 50 shown in FIG. 2. Please note two alternative styles of gripping pads 56 positioned on arm 52 as shown in FIG. 1 and FIG. 2. The gripping pad 56 may alternatively, or additionally, be placed on the housing 24 adjacent to a lower portion of the belt clip arm 52. Again please note two alternative styles of gripping pads positioned on the housing 24 adjacent to the lower portion of the belt clip 52. To provide better gripping the gripping pad 56 may comprise a raised area on either the belt clip 50 or the housing 24.

In a preferred embodiment of the invention the belt clip arm 52 has an opening 56 therethrough and the gripping pad 56 extends through the opening 54 as well as over and around the opening 54 on both a belt side and an opposite side of the belt clip arm 52. FIG. 3 is a perspective view showing the rear side portion of the belt clip 50 shown in FIG. 2. Please note two alternative styles of gripping pads 54 positioned on arm 52 as shown in FIG. 1 and FIG. 2. The gripping pad 56 may alternatively, or additionally, be placed on the housing 24 adjacent to to a lower portion of the belt clip arm 52. Again please note two alternative styles of gripping pads positioned on the housing 24 adjacent to the lower portion of the belt clip 52. To provide better gripping the gripping pad 56 may comprise a raised area on either the belt clip 50 or the housing 24.

A method of taking an internal measurement between generally parallel members 16, 18 with a tape measure 20 having a tape 22 coiled in a housing 24, a tape hook 26 external to the housing on an unattached end portion of the tape 22, measurement lines 28 and numerals 30 on a concave side portion of the tape 22 which increment from the hook 26 and which can be read when the hook is pulled from the housing 24 comprises the steps of: positioning a non slip means 34 along an outside edge portion of the hook 26 on the tape measure 20; and, pressing the non slip means 34 on the outside of the hook 26 against one member 18 with the hook 26 so that the hook 26 will be less inclined to slip therealong.

More specifically wherein the tape measure 20 comprises a light 40 positioned to illuminate a measured length on the tape 22, the above method further comprises the step of switching on the light 40 when measuring. If the light 40 comprises a light emitting diode 41 and wherein the tape comprises numerals for outside measurement of one color and numerals for inside measurement of a different color and wherein the numerals for inside measurement significantly contrast with a color of the light emitting diode then the numerals for inside measurement will significantly stand out from the numerals for outside measurement when the light 41 is switched on. If the light 40 comprises a focused light 48, the focused light 41 may be configured so that the problem of parallax is largely avoided.

If the the tape measure 20 is provided with a belt clip 50 having a downwardly extending arm 52 attached to a broad side of the housing 24 and a soft plastic gripping pad 56 is positioned on one of the belt clip arm 52 and the broad side of the housing 24 adjacent to the arm 52; then the method may further comprise the step of clipping the tape measure 20 to a worn belt 14 to thereby provide better adhesion when the belt clip 50 is engaged on the worn belt 14.

While the invention has been described with preferred specific embodiments thereof, it will be understood that this description is intended to illustrate and not to limit the scope of the invention, which is defined by the following claims.

I claim:

1. An improved tape measure having:
a tape coiled in a housing having a tape hook external to the housing on an unattached end portion of the tape, and measurement lines and numerals on a concave side portion of the tape which increment from the hook, and which can be read when the hook is pulled from the housing, and a belt clip having a downwardly extending arm attached to a broad side of the housing wherein the improvement comprises:
a soft plastic gripping pad positioned on the broad side of the housing laterally adjacent to the arm to provide better adhesion when the belt clip is engaged on a worn belt.

2. A tape measure as in claim 1 wherein the gripping pad comprises a raised area on the housing.

3. A method of using the tape measure as described in claim 1 on a belt worn around a waist comprising the steps of:
- partially engaging an end portion of the belt clip arm on the belt;
- pulling the housing of the tape measure outwardly and downwardly so that the belt is lifted away from the waist and so that the gripping pads adjacent to the belt clip on the housing no longer engage the belt;
- pulling the belt clip arm down and over the belt; and
- releasing the tape measure so that the gripping pads engage the belt thereby preventing inadvertent disengagement of the tape measure from the belt.

4. An improved tape measure having:
- a tape coiled in a housing having a tape hook external to the housing on an unattached end portion of the tape and measurement lines and numerals on a concave side portion of the tape which increment from the hook, and which can be read when the hook is pulled from the housing and a belt clip having a downwardly extending arm attached to a broad side of the housing wherein the improvement comprises:
- a soft plastic gripping pad positioned on the belt clip arm wherein a lower portion of the belt clip arm has an opening therethrough and wherein the gripping pad extends through the opening as well as over and around the opening on both a belt side and an opposite side of the belt clip arm so that thereby the gripping pad is unable to be pulled off the belt clip arm.

5. A tape measure as in claim 4 wherein the gripping pad is additionally placed on the housing adjacent to a lower portion of the belt clip arm.

* * * * *